T. I. BURHYTE.
Gate.
No. 63,008.
Patented March 19, 1867.
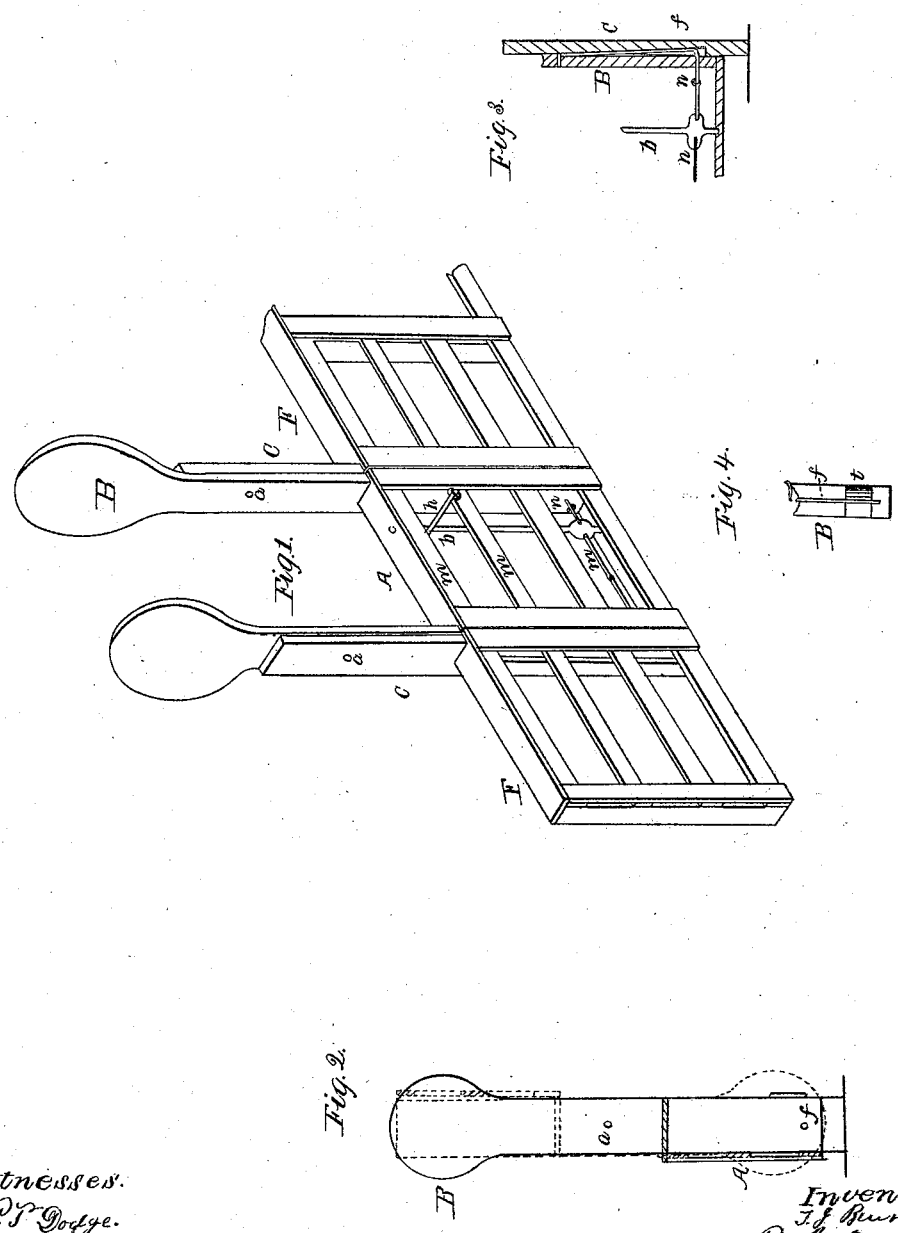

United States Patent Office.

TUNIS I. BURHYTE, OF FOND DU LAC, WISCONSIN.

Letters Patent No. 63,008, dated March 19, 1867.

IMPROVEMENT IN GATES.

The Schedule referred to in these Letters Patent and making part of the same.

TO ALL WHOM IT MAY CONCERN:

Be it known that I, TUNIS I. BURHYTE, of Fond du Lac, in the county of Fond du Lac, and State of Wisconsin, have invented certain new and useful Improvements in Gates; and I do hereby declare the following is a full, clear, and exact description thereof, reference being had to the accompanying drawings, making part of this specification, and to the letters of reference marked thereon, like letters indicating like parts wherever they occur.

To enable others skilled in the art to construct and use my invention I will proceed to describe it.

My invention consists in so constructing and hanging a gate that it can be opened by turning it upside down, it being raised sufficiently high in the operation to permit persons and teams to pass under it, and also in a novel arrangement of devices for fastening the same shut.

Figure 1 is a perspective view.

Figure 2 is a transverse vertical section.

Figures 3 and 4, views of portions shown in detail.

In fig. 1, A represents my improved gate in position, the adjoining portions of the fence on each side being represented by F.

I construct the gate of boards $m$, which are nailed, or otherwise securely attached, to two upright posts or bars B. These bars B are made of about double the height of the fence, and at their upper ends are provided with weights, either by enlarging them, as represented, or by attaching weights thereto. These weights should be sufficient to counterbalance the gate when the latter is pivoted at $a$ to the adjoining posts C, which are made higher than the ordinary posts of the fence for that purpose, as shown in fig. 1. The gate, being thus constructed, and pivoted on the horizontal bolts $a$, is opened by being turned up, the body of the gate being thus thrown up overhead, while the weighted ends of the posts B are thrown down, as represented in red in fig. 2. A cord, $c$, is attached to the post B above the pivot $a$, by which the upper end can be drawn down when the gate itself is out of reach.

A vertical rod, $b$, having a cross-arm or handle, $h$, attached to it, is pivoted to the gate, as shown in fig. 1. This rod is enlarged near its lower end, as represented at $o$ of figs. 1 and 3, and is connected by wires or links $n$ with a spring catch, $f$, fitted into a vertical recess on the outer face of each of the bars B, as shown in fig. 3, near the bottom of the gate.

To the adjoining faces of the posts C a metallic plate, $t$, is secured, having at its centre a vertical recess or notch, $f'$, to receive the spring catches $f$, the edges of the plates $t$ being inclined or bevelled on each side, so that, as the gate swings shut from either side, the spring catches $f$ will lock automatically, and thus fasten the gate without any attention from the attendant. When it is desired to open the gate it is only necessary to take hold of the handle $h$, which projects from each side of the gate, so as to be operated from either side, and turn the rod sufficiently to withdraw the spring catches $f$ from the notches in the plates $t$ when the gate is turned up, in either direction, as may be desired.

This gate is specially adapted for use in regions where snow is apt to drift, and thus interfere with the swinging or the ordinary gates. As is well known, snow usually drifts on one side only of a fence or gate; and, as this gate can be opened in either direction, it may thus be swung in a direction opposite from the drift, which will thus not interfere with its movements.

Another difficulty with ordinary gates arises from the sagging of the post to which it is attached, the entire weight of the gate acting as on a lever to pull the post over, and soon causing the gate to drag, more or less, on the ground, and interfering with its movements. As this gate is so hung as to bear equally on both posts, and to simply press on them in a vertical direction, it entirely obviates this difficulty, and, at the same time, tends to force the posts back into the ground when raised by the frost in the spring.

Having thus described my invention, what I claim, is—

1. A gate constructed with the high posts B, provided with the counterbalancing weights, said gate being pivoted to turn in a vertical plane, substantially as described.

2. The spring catches $f$, connected to the vertical rod $b$, and arranged to operate in connection with the gate, as set forth.

T. I. BURHYTE.

Witnesses:
W. C. DODGE,
P. T. DODGE.